United States Patent [19]

Gugel

[11] 4,231,419

[45] Nov. 4, 1980

[54] MANIPULATOR FOR INSPECTION AND POSSIBLE REPAIR OF THE TUBES OF HEAT EXCHANGERS, ESPECIALLY OF STEAM GENERATORS FOR NUCLEAR REACTORS

[75] Inventor: Georg Gugel, Kalchreuth, Fed. Rep. of Germany

[73] Assignee: Kraftwerk Union Aktiengesellschaft, Mülheim, Fed. Rep. of Germany

[21] Appl. No.: 926,800

[22] Filed: Jul. 21, 1978

[51] Int. Cl.² .............................................. F28F 11/00
[52] U.S. Cl. ..................................... 165/11 A; 165/76; 122/364; 138/97; 73/49.8; 414/4
[58] Field of Search ..................... 165/11, 76, 78, 95; 122/364; 138/89, 97; 29/421 E; 73/40.5 R, 40.5 A, 49.8; 414/2, 4

[56] References Cited

U.S. PATENT DOCUMENTS

| | | | |
|---|---|---|---|
| 3,934,731 | 1/1976 | Muller et al. | 165/76 X |
| 3,954,136 | 5/1976 | Gugel | 165/11 |
| 3,964,293 | 6/1976 | Faure et al. | 165/11 X |
| 4,004,698 | 1/1977 | Gebelin | 165/76 X |
| 4,148,403 | 4/1979 | Riffe | 165/76 |

FOREIGN PATENT DOCUMENTS

| | | | |
|---|---|---|---|
| 2503260 | 7/1976 | Fed. Rep. of Germany | 165/11 |
| 1207790 | 10/1970 | United Kingdom | 165/76 |

*Primary Examiner*—Albert W. Davis
*Assistant Examiner*—Margaret A. Focarino
*Attorney, Agent, or Firm*—Herbert L. Lerner

[57] ABSTRACT

Manipulator for inspecting and, if required, repairing the tubes of heat exchangers, especially for nuclear reactors, in which a tube bundle set in a tube sheet lead into a steam generator chamber and a manipulator is brought in through a lead-in nozzle. An inspection arm can be inserted and removed through the lead-in nozzle and the nozzle can be closed off tight by a blind flange. The inspection arm comprises a guide tube supported in the lead-in nozzle, and a swivel arm supported at the end of the guide tube so that it can rotate in a plane parallel to the tube sheet. The swivel arm carries at its outer end an extendable and retractable mouthpiece carrier with a mouthpiece which can be aligned onto the tube openings. The outer contour of the swivel arm and the mouthpiece carrier in the stretched-out transport position is not greater than the inner contour of the lead-in nozzle.

12 Claims, 6 Drawing Figures

MANIPULATOR FOR INSPECTION AND POSSIBLE REPAIR OF THE TUBES OF HEAT EXCHANGERS, ESPECIALLY OF STEAM GENERATORS FOR NUCLEAR REACTORS

BACKGROUND OF THE INVENTION

1. Field of the Invention

This invention relates to a manipulator for inspecting and, if required, repairing the tubes of heat exchangers, especially of steam generators for nuclear reactors, where the steam generators comprise at least one tube bundle which is set in a tube sheet and leads into a steam generator chamber, and the manipulator is brought through a lead-in nozzle of the steam generator housing with an inspection arm and can be aligned with a mouthpiece arranged at the free end of the inspection arm onto individual tube openings of the steam generator tube sheet and can be brought into engagement with these tube openings in such a manner that inspection instruments and/or tools such as eddy current probes, cleaning plugs, explosive plugs or the like can be introduced into the steam generator tubes through the mouthpiece under remote control.

2. Description of the Prior Art

A manipulator of this type is described in German Pat. No. 2,316,074 and U.S. Pat. No. 3,954,136. The inspection arm shown in the patents is bent off at its outer end and can be run into a rest position in a niche of the primary steam generator chamber, so that the flow is not impeded or only slightly impeded. With this known manipulator, it is not possible, however, to remove the inspection arm from the steam generator chamber after the inspection is completed. In addition, the tube field that can be reached by the known inspection arm, is limited. These are the difficulties to be overcome by the invention. From British Pat. No. 1,207,790, it is known in connection with a remotely controlled closing device, especially a tube plug-up device, for heat exchangers of nuclear installations, to introduce an arm carrying a closing device through a nozzle of the heat exchanger into a heat exchanger chamber and also to remove it after the heat exchanger tubes have been plugged up, where evidently a plate serving as a template during the repair is replaced by a cover plate. The plugging-up device here has a relatively large dimension in the direction of the tube sheet plane, so that the lead-in nozzle must have a relatively large diameter; on the other hand, the tube sheet in this heat exchanger is relatively small so that there is no problem for the plugging-up device to reach all heat exchanger tubes. The present invention, on the other hand, is addressed to the problem of not letting the inside diameter of the inspection nozzle become too large, and providing an inspection device that can be inserted into the steam generator chamber through the relatively small inspection nozzle so that all or practically all openings of the heat exchanger tubes can be reached by it under remote control.

SUMMARY OF THE INVENTION

An object of the invention is to provide a manipulator of the type mentioned at the outset, in which the inspection arm can be inserted, and also removed again, through the lead-in nozzle into or from the steam generator chamber and wherein the lead-in nozzle can be closed off tight by a blind flange.

With the foregoing and other objects in view, there is provided in accordance with the invention, a manipulator for inspecting and, if required, repairing the tubes of heat exchangers of steam generators, expecially for nuclear reactors, including a steam generator having at least one tube bundle set in a tube sheet with the tube endings in the tube sheet having individual tube openings leading into a steam generator chamber, an opening in the steam generator chamber, a lead-in nozzle extending into the steam generator chamber opening, means for bringing in an inspection arm through the lead-in nozzle into the steam generator chamber, means for withdrawing the inspection arm through the lead-in nozzle, a blind flange for closing off the lead-in nozzle when the inspection arm is withdrawn, a mouthpiece arranged at the free end of the inspection arm, remote control means for aligning the inspection arm with the mouthpiece onto any individual tube opening for engagement with the tube opening whereby inspection instruments and tools such as eddy current probes, cleaning plugs, explosive plugs and the like can be introduced into the tubes through the mouthpiece and removed after the inspection is completed, the inspection arm including an elongated guide tube, movably lengthwise, in the lead-in nozzle, a swivel arm at the end of the elongated guide tube supported rotatably in a plane parallel to the tube sheet, an extendable and retractable mouthpiece carrier connected at the end of the swivel arm, and a mouthpiece which can be aligned onto the tube openings disposed on the mouthpiece carrier, with the outer contour of the swivel arm and the mouthpiece carrier in a stretched out transport position for bringing into or withdrawal from the steam generator chamber, not greater than the inner contour of the lead-in nozzle to permit transport therethrough.

Other features which are considered as characteristic for the invention are set forth in the appended claims.

Although the invention is illustrated and described herein as embodied in a manipulator for inspection and possible repair of the tubes of heat exchangers, especially of steam generators for nuclear reactors, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which:

FIG. 5 showing schematically different swivel and test positions of the manipulator.

DETAILED DESCRIPTION OF THE INVENTION

The inspection arm in such a manipulator comprises a guide tube which is supported in the lead-in nozzle movably in the lengthwise direction, and a swivel arm which is supported at the end of the guide tube so that it can rotate in a plane parallel to the tube sheet, and which carries at its outer end an extendable and retractable mouthpiece carrier with a mouthpiece which can be aligned onto the tube openings. The outer contour of the swivel arm and the mouthpiece carrier in a stretched-out transport position is at most equal to, or smaller than, the inner contour of the lead-in nozzle. An advantage obtainable with the invention is seen in the fact that the insertion of manipulators into the primary chamber, avoids the necessity, for the inspection of steam generator tubes, of personnel climbing through the manhole and thereby, exposing themselves to high radiation. Instead, it is only necessary to open the blind flange of the inspection nozzle and to introduce through the latter the manipulator into the primary chamber. Now, all tube positions can be approached by the mouthpiece from the outside under remote control. The inspection nozzle preferably goes through the biological shield, so that the opening of the blind flange, the insertion and removal of the manipulator and the reclosing of the blind flange can be accomplished with very low radiation exposure. It has been found that an inspection nozzle with an inside diameter of about 100 mm is sufficient for the purpose described. The welding of such a nozzle into steam generator housing and closing the same can be accomplished without difficulty with the present state of welding and sealing technology.

Preferably, the mouthpiece carrier is also designed as a swivel member and can be folded about a pivot axis lying in the plane of the swivel arm into a 90° position, in which its mouthpiece is aligned in the direction of the axis of the tubes to be tested. The respective end positions of the mouthpiece carrier can be indicated correspondingly by end switches. Thereby, a particularly slim design can be obtained. According to a further embodiment of the invention, the guide tube is supported movably in the lengthwise direction, at the inside circumference of an intermediate tube which can be inserted into the lead-in nozzle and can be associated with the latter by means of an antifriction bearing engaging at its outer circumference. Drive means of a drive fastened to the intermediate tube are in engagement with drive means of the guide tube.

Further features and details of the invention will be explained in the following with the aid of two embodiment examples shown in the simplified, diagrammatical drawings in which the parts which are not required for an understanding of the invention are omitted.

Figure 1:
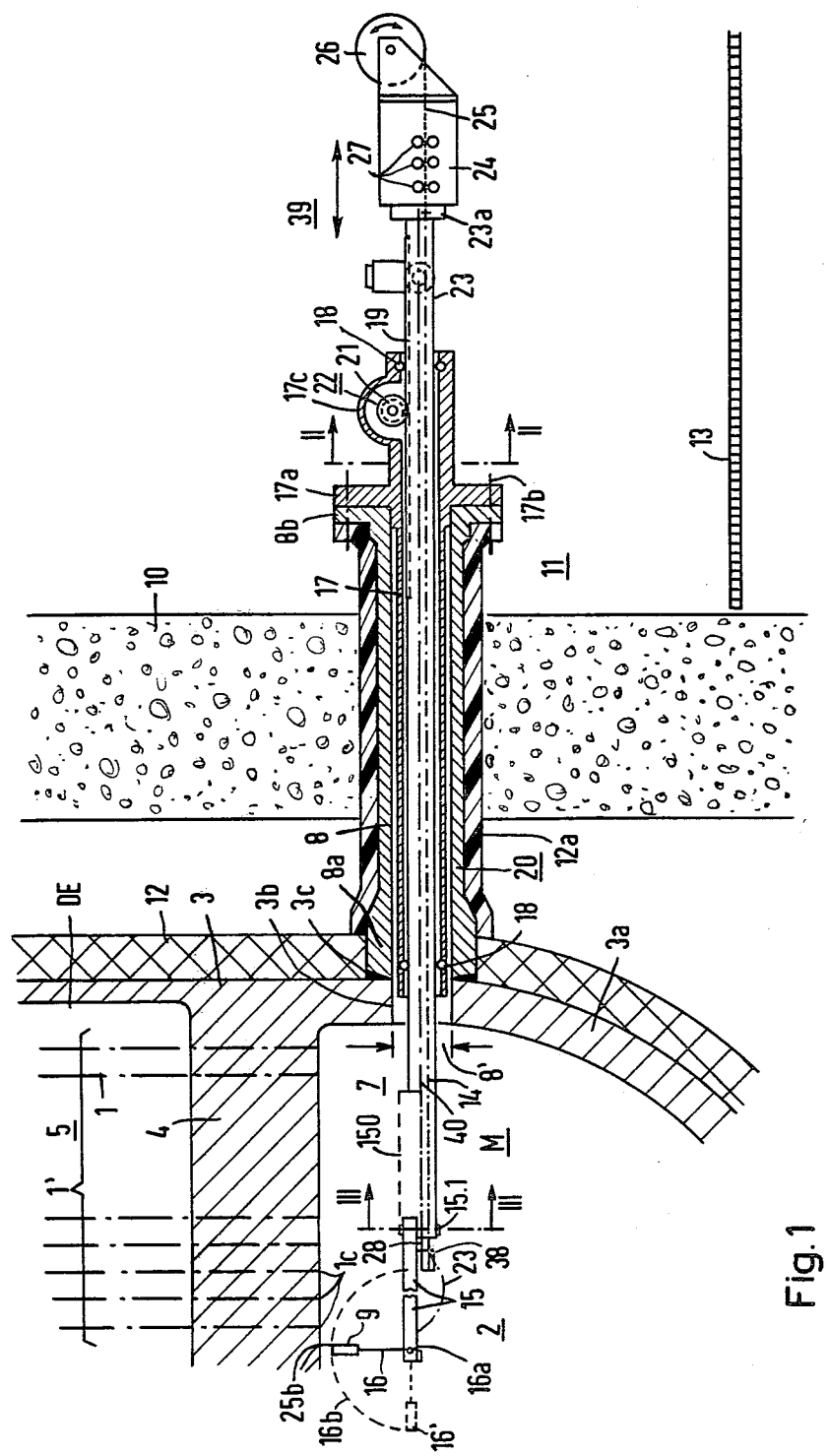
FIG. 1 diagrammatically illustrates the manipulator according to the invention, in partial section, in the test position, where the mouthpiece carrier at its swivel arm is brought into the primary chamber of a steam generator through the inspection nozzle.

The manipulator, designated generally by the letter M in FIG. 1, serves for inspecting and, if necessary, repairing the tubes 1, indicated by dash-dotted line, of a steam generator designated generally by the letters DE, for pressurized-water reactors. A heat exchanger in general may also be involved instead of a steam generator; however, remotely controllable inspection and, if required, repair of the tubes 1 is of importance particularly in steam generators for pressurized-water reactors, through which the active reactor coolant flows on the primary side, so that radioactivity still emanates from the walls 3 of the steam generator DE, its tube sheet 4 and the tubes 1 themselves even if the reactor coolant has been drained from the primary chamber 2 and this chamber had been filled with normal water for shielding purposes. Only a section of the steam generator DE is shown in FIG. 1, which in this case comprises a U-tube bundle 1' with the two legs 1a and 1b (see FIG. 5), the tubes 1 of the tube bundles 1a and 1b being set tightly in the tube sheet 4 and being in communication at their openings 1c with the primary chamber space 2. The secondary chamber, in which the feed water is evaporated, is designated by the numeral 5. The spherical bottom portion 3a of the steam generator DE which, together with the tube sheet 4 confines the primary chamber 2, is subdivided by the curved partition 6 into an inlet chamber 2a on the primary side and an outlet chamber 2b. The outlet chamber 2b is associated with the so-called cold leg 1b of the tube bundle 1' and the inlet chamber 2a is associated with the so-called hot leg 1a of the tube bundle 1'.

As is shown in FIG. 1 in particular, the mainpulator M with an inspection arm 7 is brought through a lead-in nozzle 8 of the steam generator housing 3 and can be aligned with a mouthpiece 9 arranged at the free end of the inspection arm 7 onto individual tube openings 1c of the steam generator tube sheet 3 and brought into engagement with these tube openings in such a manner that inspection instruments and/or tools such as eddy current measuring probes, cleaning plugs, explosive plugs or the like can be introduced into the tubes 1 of the steam generator DE through the mouthpiece 9 under remote control. The above-mentioned instruments and tools are not specifically shown in the drawing; the ones in question may be, for example, those which are described in detail in German Pat. No. 2,263,143. The lead-in nozzle 8 is welded at its reinforced end 8a to the housing 3 (weld 3c) in the vicinity of a through hole 3b of the housing 3. At the other end, the lead-in nozzle 8 has a flange 8b, which can be closed off tight by a cover or blind flange (not shown) when the manipulator M is not inserted or is taken out. The lead-in nozzle 8 is brought through the wall 10 of the biological shield consisting of concrete, so that the manipulator M can be inserted and removed from the space 11 (outside the biological shield 10), where the exposure of the personnel to radiation is very low. The steam generator DE and the lead-in pipe 8 are surrounded by an insulating jacket 12 and 12a, respectively. The steam generator DE is placed on the foundation in a manner which is of no specific interest here. Numeral 13 designates an intermediate floor which confines the space 11 downward; the manipulator M can be handled from the room 11.

The inspection arm 7 comprises a guide tube 14 which is supported movably in the lengthwise direction in the lead-in nozzle 8. A swivel arm 15 is supported at the end of the guide tube 14 so that it can rotate in a plane parallel to the tube sheet 4. The swivel arm 15 carries at its outer end an extendable and retractable mouthpiece carrier 16, which with the already mentioned mouthpiece 9 can be aligned onto the tube openings 1c. As the stretched-out transport position 16' shows by dashed lines, the outer contours 150 of the swivel arm 15 and the mouthpiece carrier 16, in this transport position, is at most equal to, or preferably smaller than, the inner contour 8' of the lead-in nozzle 8. Therefore, the inspection arm 7 with the guide tube 14, the swivel arm 15 and the mouthpiece carrier 16 can be pushed, together with an intermediate tube 17 surrounding the guide tube 14, through the lead-in nozzle 8, i.e., through its inside bore 8' and can be fixed in sealed condition in this illustrated, inserted position by clamping a ring flange 17a of the intermediate tube 17 tight against the counterflange 8b of the lead-in nozzle 8 by means of flange bolts 17b, with the interposition of a metallic ring seal, not shown.

Figure 2:
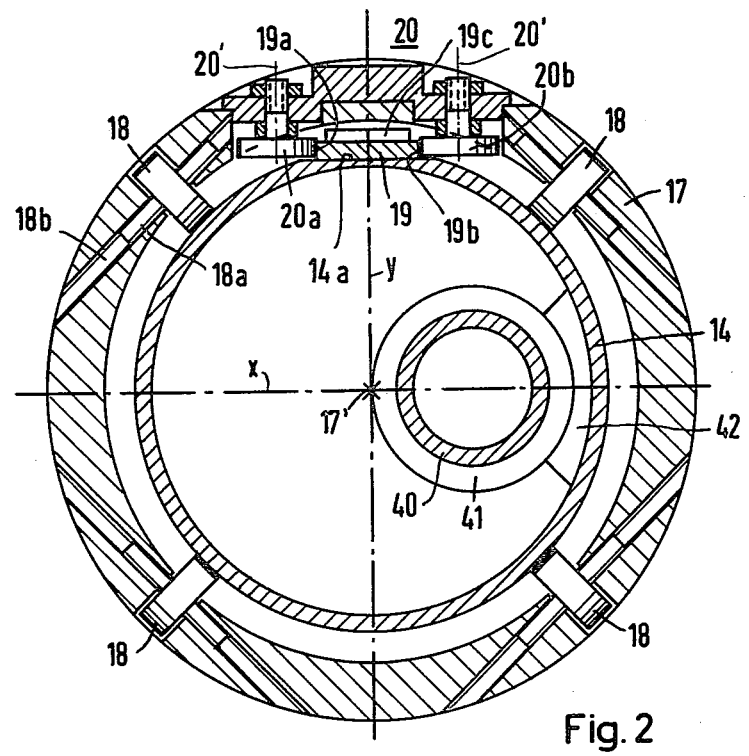
FIG. 2 is a cross section through the guide tube and the intermediate tube taken along the line II—II of FIG. 1.

As shown in FIG. 2, the intermediate tube 17 is equipped at its inner circumference with guide rolls 18 for the guide tube 14. The axles 18a of the guide rolls 18 are inserted into corresponding tangential drill holes 18b of the intermediate tube and corresponding slots are cut into the intermediate tube 17 so that the guide rolls 18 can roll freely. A rack 19 which extends parallel to the longitudinal axis 17' of the intermediate tube 17 and which is mounted on a flat 14a of the guide tube 14 is provided on the outside of the guide tube 14. Further guide rolls 20 are rotatably supported at the inner circumference of the intermediate tube 17 for guidance in the axial direction and at the same time as protection against twisting. One guide roll 20a and 20b is associated with respective flanks 19a, 19b of the rack 19 having teeth 19c. Contrary to the rolls 18, the axles 20' of the rolls 20 are not aligned tangentially but parallel to the vertical main axis Y and approximately with mirror symmetry with respect to this main axis, as is the rack 19 itself.

The rack 19, i.e., the teeth 19c, meshes with the drive pinion 21 (see FIG. 1) of a longitudinal guide tube drive 22. The latter is accomodated in a corresponding recess 17c of the intermediate tube 17. The first guide rolls 18 and the second guide rolls 20 seen in detail in FIG. 2 are distributed over the length of the intermediate tube 17 but are supported at least at the beginning and the end of the intermediate tube 17, as shown in FIG. 1. As another possibility of a longitudinal drive for the guide tube 14 (not shown), a spindle drive could be employed, in which the guide tube 14 is provided at its outer circumference with a thread, this thread being engaged by a driving nut which is arranged rotatably but in an axially stationary position and which is set in rotation by a nut-turning drive, so that the guide tube can be displaced in this manner axially in both longitudinal directions, depending on the direction of rotation of the nut.

Inside the guide tube 14 runs a flexible guide tube 23 which leads to the mouthpiece 9. The outer end 23a of flexible guide tube 23 is secured inside a feed unit 24 connected to the guide tube 14. The feed unit 24 serves to drive a flexible thrust tube 25 which is led from a supply reel 26, which can also be called a thrust tube winding device, between the drive rolls 27 and is threaded into the end 23a of the guide tube 23. The thrust tube 25, provided at its outer end 25b with measuring and/or repair devices, can therefore be transported by means of the feed unit 24 through the guide tube 23 and the mouthpiece 9, into the respective steam generator tube 1, unwinding from the thrust tube supply 26, and the measuring or repair device can be pulled out from the tube 1 when the repair is completed.

Figure 3:
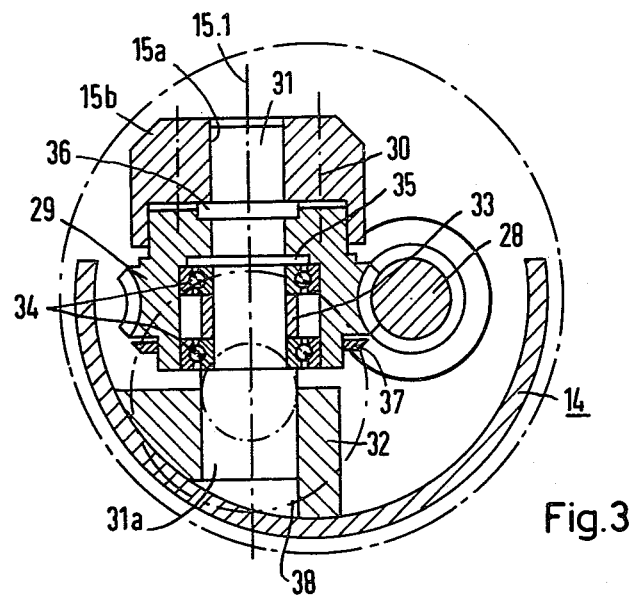
FIG. 3 is a cross section throught the guide tube at the height of the swivel arm joint taken along the line III—III of FIG. 1.

In FIG. 3, the swivel bearing for the swivel arm 15, designated in FIG. 1 by the numeral 15.1, can be seen in detail. The swivel arm 15 is driven via a worm 28 and worm gear 29, the latter being flanged (flange bolts 30) to the end 15b of the swivel arm, which has an eye 15a. The swivel arm 15 with its eye 15a and the worm gear 29 is rotatably supported at a bearing pin 31 which is fastened to the guide tube 14. To this end, a bearing bracket 32 with an inside hole in which the pin 31 sits with enlarged end 31a, is welded to the inner circumference of the lower half of the guide tube 14. For clarity, the larger part of the upper half of guide tube 14 is cut away in this region as shown in FIG. 3. After insertion of a spacer sleeve 33 on the middle part of the bearing pin 31, a ring 34 of an antifriction bearing is mounted on each side of spacer sleeve 33. Between the end 15b of the swivel arm 15 and the worm gear 29 is a washer 36 and a ring space 35. The miter gear 37 firmly connected to the worm gear 29 serves to drive a pulse generator 38, the outlines of which are indicated in dash-dotted lines in FIG. 3. Pulse generator 38 delivers electrical and, in particular, digital signals corresponding to the respective position of the swivel arm 15, via control lines not shown, to a control console which is arranged, for instance, in the vicinity of the thrust hose supply 26. The arrangement of such control consoles, control cabinets or the like provided for remote control is not the subject of the present application and has been explained in German Pat. No. 2,263,143. The worm can be driven via a worm motor of correspondingly slim design, which is arranged immediately adjacent to the worm 28 in the guide tube 14. In the embodiment example shown, the work motor 39 is fastened to the outside of the lead-in nozzle 8 outside the guide tube 13 and is coupled to the worm 28 via a drive shaft 40 installed in the guide tube 14. Like the worm motor 39, this is indicated only schematically in FIG. 1.

The shaft 40 can be seen in cross section in FIG. 2. The shaft 40 is rigid and is fastened to the guide tube 14 via needle bearings 41 distributed over its length via corresponding bearing cages 42. A flexible shaft could also be used; the position is taken off likewise directly at the worm gear because of the unequivocal, torsion-free correlation.

The mouthpiece carrier 16, as shown in FIG. 1, is designed as a swivel member and can be folded about a swivel axis 16a lying in the plane of the swivel arm from a stretched-out transport position into a 90° position (shown in FIG. 1), in which its mouthpiece 9 is aligned in the direction of the axis of the respective tube 1 to be tested. The arc of the swivel angle is designated by 16b. For transport purposes, the mouthpiece carrier 16 could also be laid with its mouthpiece 9 into a corresponding recess of the swivel arm 15 (folding into the 0° position), so that the outline 150 would be assured. For this, however, great flexibility of the guide tube 23 and thrust hose or tube 25 is necessary, which is not the case in the preferred embodiment with stretched-out transport position.

Figure 4:
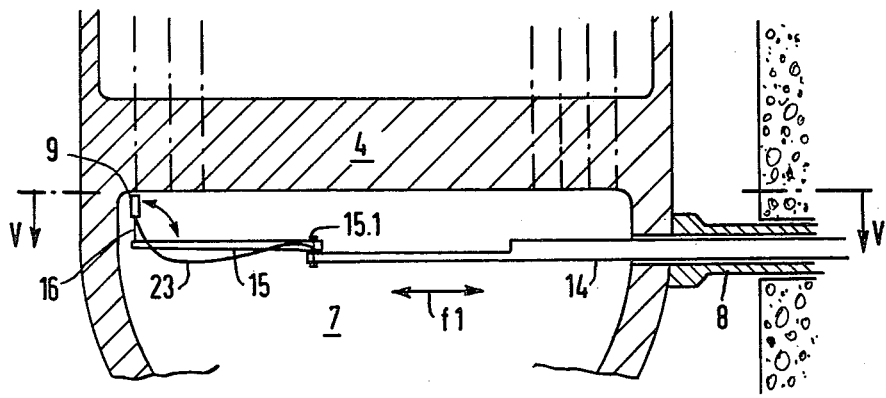
FIG. 4 is a side elevation.
Figure 5:
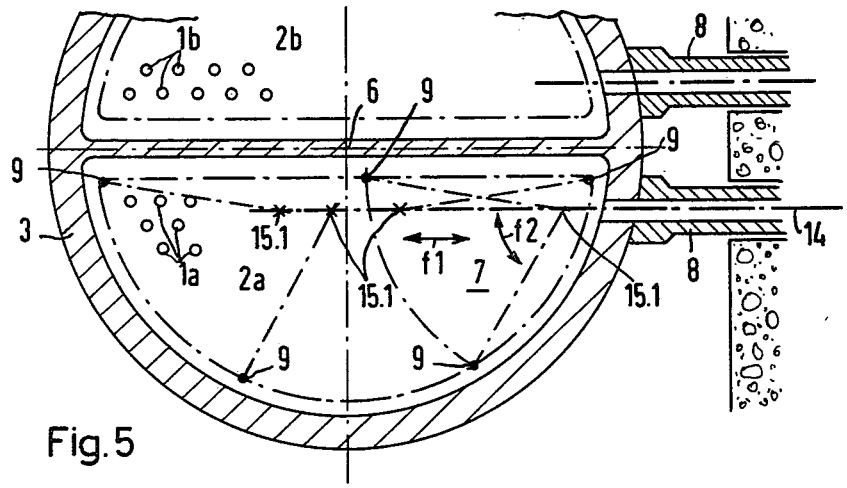
FIG. 5 is a top view, partially in cross section, of a section of the primary chamber of the steam generator with the manipulator in the test position.
Figure 6:
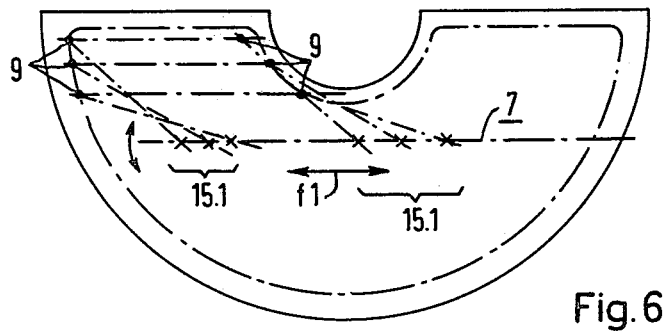
FIG. 6 is a schematic top view of one-half of the primary chamber of a straight-tube steam generator with a central tube; by showing several test positions of the mainpulator to illustrate that every point of the tube field can be reached.

In FIGS. 4 and 5, the moving mechanism is illustrated schematically once more, the position of the mouthpiece 9 being designated with 9 and the position of the swivel arm axis with 15.1. The arrow f1 symbolizes the lengthwise diplcement of the inspection arm 7 and the arrow f2, the swivel motion of the swivel arm 15. It is evident that all the tube openings can be reached, which is also the case for the second embodiment example according to FIG. 6, where like parts are provided with the same reference symbols. The mouthpiece carrier 9 can also be provided as carrier of an endoscope for observing the material of the steam generator tubes 1 in situ and can further be designed as the carrier of television cameras, suitable light guide cables being brought through the guide tube 23 to the control cabinet. It is also possible with the manipulator according to the invention to bring a welding device remotely controlled to the opening 1c of the tubes 1. In FIG. 5 each steam generator primary chamber 2a, 2b shows a lead-in nozzle for inspecting it.

There is claimed:

1. Manipulator for inspecting and, if required, repairing the tubes of heat exchangers of steam generators, especially for nuclear reactors, comprising a steam generator having at least one tube bundle set in a tube sheet with the tube endings in the tube sheet having individual tube openings leading into a steam generator chamber, an opening in the steam generator chamber, a lead-in nozzle extending into said steam generator chamber opening, means for bringing-in an inspection arm through the lead-in nozzle into the steam generator chamber, means for withdrawing the inspection arm through the lead-in nozzle, a blind flange for closing off the lead-in nozzle when the inspection arm is withdrawn, a mouthpiece arranged at the free end of the inspection arm, remote control means for aligning the inspection arm with the mouthpiece onto any individual tube opening for engagement with the tube opening whereby inspection instruments and tools such as eddy current probes, cleaning plugs, explosive plugs and the like can be introduced into the tubes through the mouthpiece and removed after the inspection is completed, said inspection arm comprising an elongated guide tube, movably lengthwise, in the lead-in nozzle, a swivel arm at the end of the elongated guide tube supported rotatably in a plane parallel to said tube sheet, an extendable and retractable mouthpiece carrier connected at the end of the swivel arm, and a mouthpiece which can be aligned onto the tube openings disposed on the mouthpiece carrier, with the outer contour of said swivel arm and said mouthpiece carrier in a stretched out transport position for bringing into or withdrawal from the steam generator chamber, not greater than the inner contour of said lead-in nozzle to permit transport therethrough.

2. Manipulator according to claim 1, wherein the mouthpiece carrier is a swivel member and can be turned about a swivel axis lying in the plane of the swivel arm into a 90° position, in which its mouthpiece is aligned in the direction of the axis of the tubes to be tested.

3. Manipulator according to claim 1, wherein the guide tube is supported, movably lengthwise, at the inner circumference of an intermediate tube inserted into the lead-in nozzle, said intermediate tube having anti-friction bearings fastened thereto which engage the guide tube at its outer circumference, and wherein drive means of a drive fastened to said intermediate tube engage with drive means of the guide tube.

4. Manipulator according to claim 3, wherein the drive means of a turning drive fastened to the intermediate tube is a drive pinion which meshes with a rack which is the drive means of the guide tube.

5. Manipulator according to claim 1, wherein the swivel arm is driven via a worm and worm gear, said worm gear being flanged to the end of the swivel arm having a bearing eye, the swivel arm with its bearing eye and the worm gear being supported rotatably at a bearing pin fastened to the guide tube, and wherein a worm motor fastened to the guide tube is associated with the worm.

6. Manipulator according to claim 5, wherein a worm motor of slim design is arranged immediately adjacent to the worm in the guide tube.

7. Manipulator according to claim 5, wherein the worm motor is fastened to the outside of the guide tube outside the lead-in nozzle and is coupled to the worm via a drive shaft installed in the guide tube.

8. Manipulator according to claim 7, wherein the drive shaft is rigid and is rotatably supported at the guide tube by means of needle bearings distributed over its length.

9. Manipulator according to claim 7, wherein the drive shaft for the swivel arm is a flexible shaft.

10. Manipulator according to claim 3, wherein an electric step generator each is associated with the drive for longitudinal displacement of the guide tube and for the swivel arm drive.

11. Manipulator according to claim 1, wherein a flexible guide tube leading to the mouthpiece is installed inside the guide tube, with the outer end of the flexible guide tube secured within a feed unit for a flexible thrust tube, with said feed unit connected to the guide and a thrust tube supply from which the thrust tube can be transported wih the measuring and repair devices attached thereto, by means of the feed unit, through the guide tube and the mouthpiece into each individual steam generator tube.

12. Manipulator according to claim 2, wherein end switches which can be operated by the mouthpiece carrier in its stretched-out position and in its 90° operating position for the purpose of indicating the position, are mounted at the swivel arm.

* * * * *